United States Patent
Wiedemann et al.

(10) Patent No.: US 6,267,045 B1
(45) Date of Patent: Jul. 31, 2001

(54) COOKING DEVICE WITH ENERGY STORAGE AND EXTRACTION SYSTEM

(75) Inventors: Peter Wiedemann, Klosterlechfeld; Peter Kohlstrung, Kaufering, both of (DE)

(73) Assignee: Rational AG, Landsberg/Lech (DE)

( * ) Notice: Subject to any disclaimer, the term of this patent is extended or adjusted under 35 U.S.C. 154(b) by 0 days.

(21) Appl. No.: 09/701,312
(22) PCT Filed: May 31, 1999
(86) PCT No.: PCT/DE99/01668
§ 371 Date: Jan. 9, 2001
§ 102(e) Date: Jan. 9, 2001
(87) PCT Pub. No.: WO99/63277
PCT Pub. Date: Dec. 9, 1999

(30) Foreign Application Priority Data

May 29, 1998 (DE) .............................. 198 24 172

(51) Int. Cl.[7] .............. A23L 1/00; A47J 36/24; F24C 15/34; F24C 15/32
(52) U.S. Cl. ............. 99/330; 99/337; 99/342; 99/355; 99/417; 99/467; 99/476; 99/516; 219/386; 219/401
(58) Field of Search .............. 99/326–334, 337, 99/339, 340, 342, 352–355, 403–417, 467–476, 516, 483; 126/21 A, 20, 369; 219/386, 385, 400, 401, 393, 396, 492; 239/461, 509; 392/492, 360, 393, 400, 399; 426/523, 509–511

(56) References Cited

U.S. PATENT DOCUMENTS

| | | | | |
|---|---|---|---|---|
| 3,889,099 | * | 6/1975 | Nuss | 219/393 |
| 4,110,916 | * | 9/1978 | Bemrose | 99/476 X |
| 4,503,760 | * | 3/1985 | Pryputsch et al. | 126/21 A |
| 4,823,766 | * | 4/1989 | Violi | 126/20 |
| 5,029,519 | * | 7/1991 | Boyen | 99/341 |
| 5,272,963 | * | 12/1993 | Del Fabbro | 99/468 |
| 5,423,248 | * | 6/1995 | Smith et al. | 219/400 X |
| 5,481,962 | * | 1/1996 | Tedesco | 99/330 X |
| 5,499,577 | * | 3/1996 | Tommasini | 219/400 X |
| 5,503,061 | * | 4/1996 | Hopkins | 99/476 |
| 5,615,603 | * | 4/1997 | Polin | 99/476 X |
| 5,690,020 | * | 11/1997 | Kitani et al. | 99/483 X |
| 5,694,835 | * | 12/1997 | Mangina | 99/476 X |

FOREIGN PATENT DOCUMENTS

| | | |
|---|---|---|
| 22 29 939 | 1/1974 | (DE) . |
| 23 34 285 | 1/1975 | (DE) . |
| 41 06 348 | 9/1992 | (DE) . |
| 197 57 415 | 4/1999 | (DE) . |

* cited by examiner

Primary Examiner—Timothy F. Simone
(74) Attorney, Agent, or Firm—Schiff Hardin & Waite

(57) ABSTRACT

The invention relates to a cooking device with a cooking chamber, a heating device, a circulating system, an energy storage and extraction system and a measuring and regulating system connected to the heating device, the circulating system and the energy storage and extraction system.

11 Claims, 2 Drawing Sheets

COOKING DEVICE WITH ENERGY STORAGE AND EXTRACTION SYSTEM

The invention relates to a cooking device with a cooking chamber, a heating device, a circulating system, an energy storage and extraction system and a measuring and regulating system, which is connected to the heating device, the circulating system and the energy storage and extraction system.

Conventional cooking devices are usually uneconomical, to the extent that their components are operated with externally supplied energy.

For example, DE 197 57 415 C1 discloses a cooking device with heat recirculation, in which a heat transfer fluid flows through a heating heat exchanger which emits heat to the cooking medium of the cooking device. The temperature of the heat transfer fluid is increased by compression upstream of the heating heat exchanger, if appropriate with a preheating device arranged ahead.

DE 23 34 285 A1 discloses a cooking device of the generic type with a heat accumulator, from which stored thermal energy can be extracted at desired times of limited duration and can be delivered to a cooking air stream. Used for this purpose is a monolithic heat accumulator block, which can be integrated in the cooking device only poorly, tends to crack, usually also has poor thermodynamic properties and is not capable of satisfactorily covering high and low temperature ranges.

DE 2 229 939 A1 discloses a heat accumulator, which is made up of individual shaped blocks, for a cooking device. At least part of the air stream thermally preparing a food can be blown through the accumulator.

A latent heat accumulating means as part of a condenser of a cooking device is known from DE 41 06 348 A1.

SUMMARY OF THE INVENTION

It is the object of the present invention to develop the cooking device of the generic type further in such a way that it overcomes the disadvantages of the prior art, and in particular permits optimized energy regulation for a large temperature range.

This object is achieved according to the invention by the energy storage and extraction system comprising at least a first energy store for accommodating a first material, which is suitable for accumulating heat and/or consumes or releases latent heat during a phase transition, and at least a second energy store for accommodating a second material, which is suitable for accumulating cold and can be charged with heat and/or cold energy inductively, resistively and/or convectively.

Furthermore, it may be provided that the first energy store can be charged with energy by means of a heating device, preferably in cooking phases which require no or little energy, and/or breaks in cooking, and/or by means of waste heat, such as heat from waste air, condensate, the non-condensed part of a cooking medium and/or excess steam.

Furthermore, it may be provided that the first material comprises a metal, a salt, a polymer, water, steam and/or superheated steam.

The second material may comprise a metal, a salt, a polymer, water and/or iron.

According to the invention, it is preferred that the first and/or second energy store of the energy storage and extraction system is or are arranged in a space-saving manner in an insulating skin of the cooking device.

Furthermore, it may be provided that the energy stored in the energy storage and extraction system can be used in the form of thermal, electrical and/or mechanical energy in the cooking device, in particular for at least partly operating the heating device, the circulating system, a moisture-regulating device, a steam generator and/or a cooling unit, by using the measuring and regulating system.

Furthermore, it may be provided that energy can be extracted from the energy storage and extraction system convectively, in particular via at least one heat transfer surface.

Furthermore, it is proposed according to the invention that energy can be extracted from the energy storage and extraction system by restriction and/or compression, preferably of a steam that is present as the first material, by adding water and/or vaporizing water on hot walls, in particular for vaporizing water and/or heating a cooking process.

It is also proposed according to the invention that energy can be extracted from the energy storage and extraction system by expansion and/or relaxation, preferably of a medium that is present as the second material, in particular for cooling the cooking chamber, freezing cooking ingredients before and/or after cooking, and/or condensing out vapors from the cooking chamber.

Finally, a preferred further development according to the invention is proposed, in which the measuring and regulating system ensures that the maintaining of a cooking process always has highest priority.

The invention is consequently based on the surprising finding that, by fitting an energy storage and extraction system which comprises at least one heat accumulator and at least one cold accumulator and is connected to the measuring and regulating system already present in a conventional cooking device, the power consumption can be reduced by operating a heating device, a steam generator, a fan, a cooling unit, a humidity regulating unit etc. in a regulated manner, with simultaneous utilization of waste heat and/or cold, by controlled and simple extraction of stored energy, without conventional cooking devices having to be converted.

In this process, an energy store can, for example during breaks in cooking, which always occur in the case of batch operation or as a result of the cooking sequence, and/or in cooking phases in which a cooking process requires little or no energy, be charged by means of a, possibly additional, heating device, which is controlled by the measuring and regulating system, in accordance with a priority hierarchy, for ensuring an undisturbed sequence of a cooking process, or by the heat from waste air emerging from the cooking chamber or emerging excess steam. Then during high energy cooking phases, in which the cooking process requires a large amount of energy, then system is able to extract more energy from the energy store than the heating device installed for heating the cooking ingredients can deliver.

Cooking processes with high energy consumption can also be speeded up by using a cooking device according to the invention, in particular at the beginning. If, for example, the energy store is rated at a capacity of 2 kWh and its energy is extracted in the first 10 minutes of cooking, this produces a power increase of 12 kW, that is to say that, with a heating power of 9 kW, in the first 10 minutes of cooking 21 kW are made available to the cooking process.

The presence of a heat accumulator and a cold accumulator also allows something being cooked to be frozen, subsequently cooked and possibly frozen again in the (partially) cooked state in an energy-saving way.

Thermal energy can also be converted into cold, in order for example to condense vapors out of the cooking chamber.

Further features and advantages of the invention emerge from the following description, in which two exemplary embodiments of the invention are explained in detail on the basis of schematic drawings;

DESCRIPTION OF THE PREFERRED EMBODIMENTS

Figure 1:
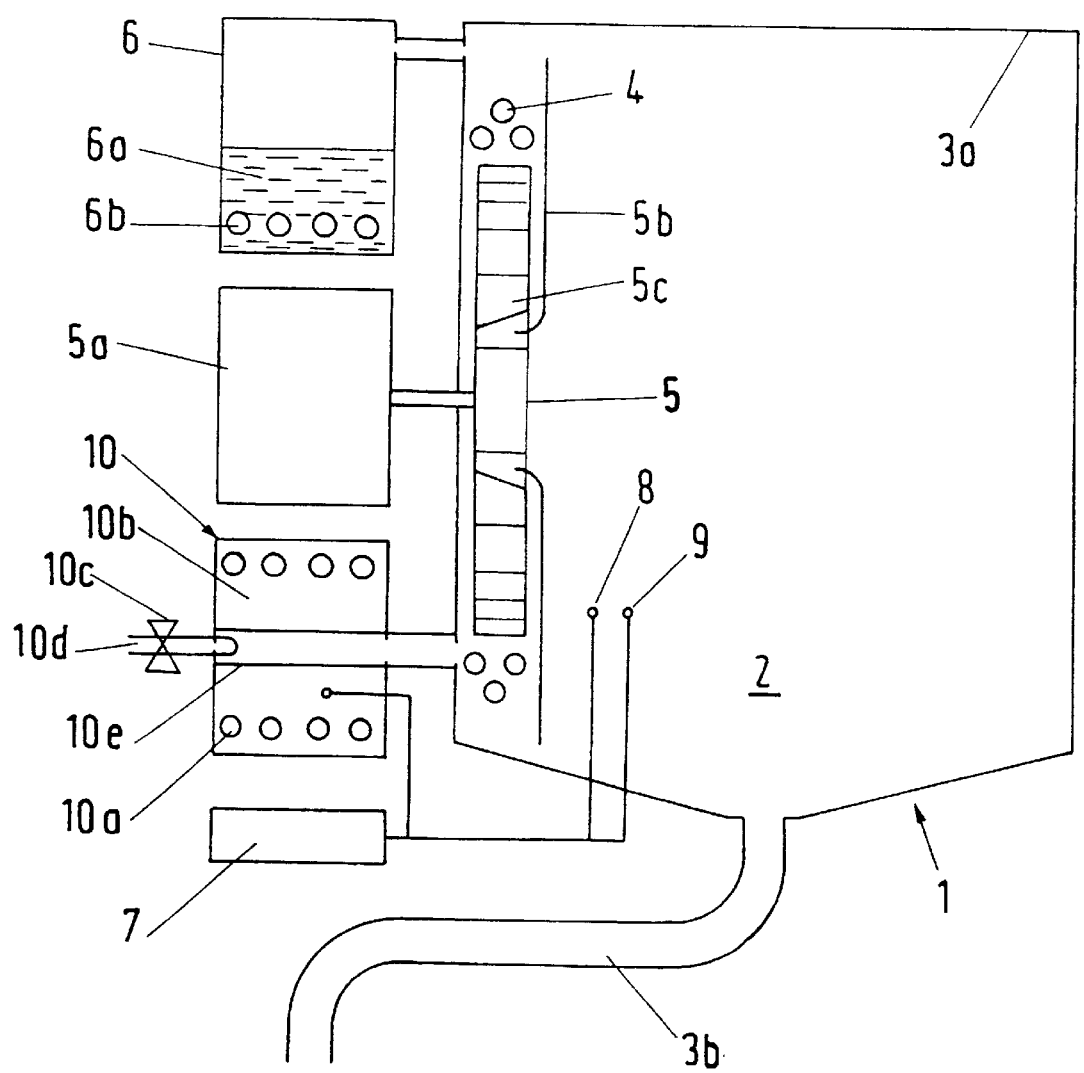
FIG. 1 shows a sectional view through a cooking device according to the invention with an energy storage and extraction system.

As FIG. 1 reveals, a cooking device 1 according to the invention comprises a cooking chamber 2, which is bounded by walls 3a and connected to an outlet 3b, a heating device 4 for heating a cooking medium for the cooking ingredients, a circulating system 5 for cooking medium, comprising a motor 5a, a circulating device 5c and a flow guide 5b, a steam generator 6, for moistening the cooking ingredients, comprising water 6a and a heating device 6b, and a regulating device 7, which is connected to the heating device 4, the circulating system 5, the steam generator 6, a moisture sensor 8, a temperature sensor 9 and an energy storage and extraction system 10. The regulating device 7, which in conventional cooking devices merely has the task of regulating the moisture and temperature of the cooking ingredients and vapor-applying cycles, has according to the invention an additional control loop, which regulates the energy content of the energy storage and extraction system 10, the control algorithm used being formed in such a way that maintaining the cooking process always has the highest priority.

The energy storage and extraction system 10 in this case comprises a heating device 10a and an energy store 10b, which is connected via a valve 10c to a water supply 10d, and comprises a heat transfer surface 10e. In this case, both the heating device 10a and the valve 10c are connected to the regulating device 7 for selective energy charging and energy extraction.

The cooking device 1 described with respect to FIG. 1 operates for example as follows:

In those cooking phases, in which a cooking process requires only little or no energy, in charging and discharging phases of the cooking device 1 and in sequence-dependent breaks in cooking, the regulating device 7 provides that the heating device 10a heats up the energy store 10b, which acts as a heat accumulator.

In high energy cooking phases, in which the cooking process requires an extremely large amount of energy, more than the heating device 4 installed in the cooking chamber 2 can make available, the energy storage and extraction system 10 additionally feeds steam into the cooking chamber 2 and in this way enriches the cooking medium with moisture and heat. The steam is in this case generated by water being supplied via the water supply 10d and the valve 10c, opened by the regulating device 7, the water evaporating when it contacts the heat transfer surface 10e.

Figure 2:
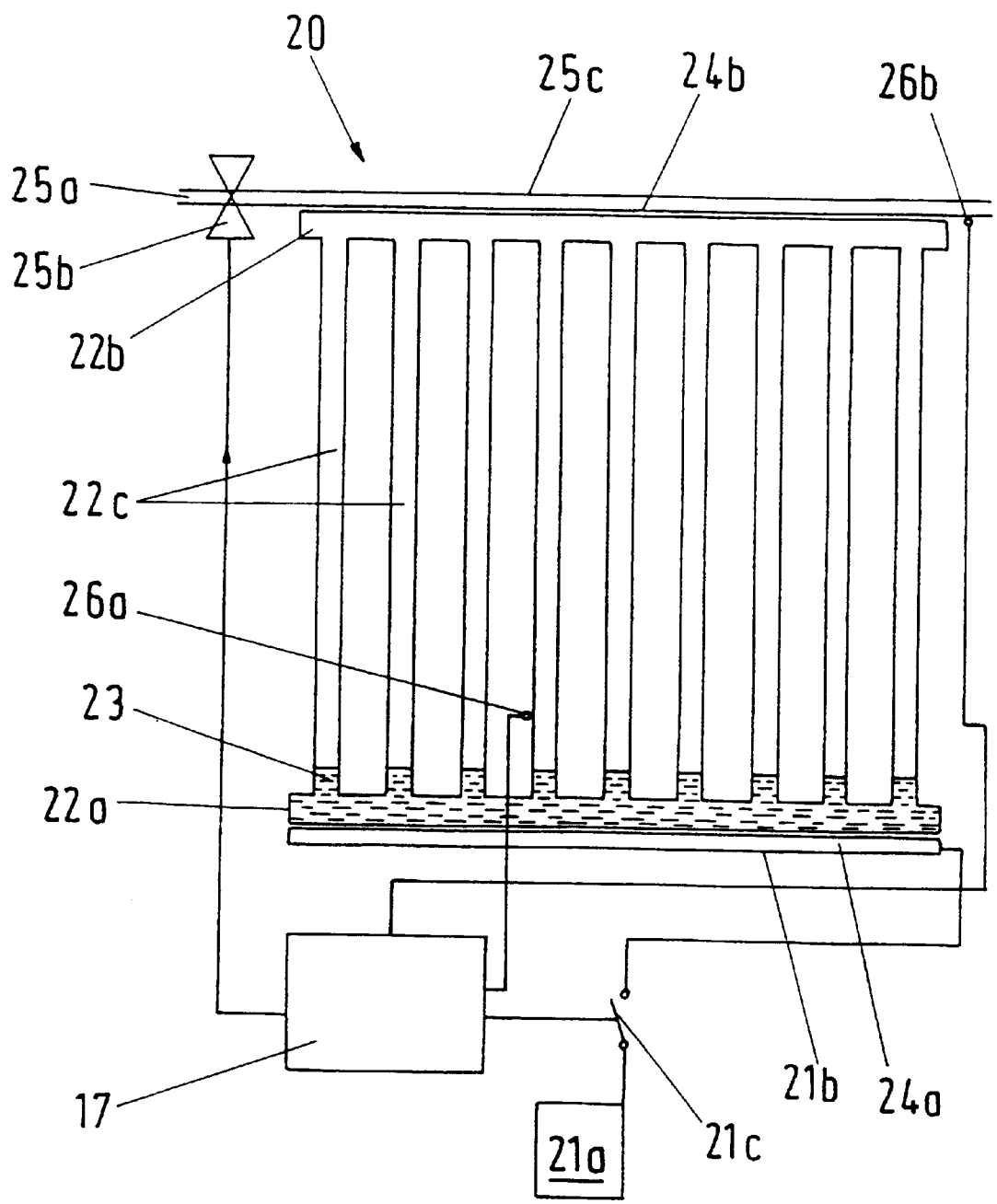
FIG. 2 shows a sectional view through an alternative energy storage and extraction system for use in a cooking device according to the invention.

The energy storage and extraction system 20 represented in FIG. 2 comprises a heating device 21b which can be heated via a power source 21a, it being possible to regulate the heating via a regulating device 17 and a switch 21c. The energy store itself comprises two parallel connecting pipes 22a, 22b, between which a multiplicity of pipes 22c run, the pipe system 22a, 22b, 22c enclosing a certain amount of hermetically sealed water 23. For taking up energy, a heat conductor 24a is provided between the heating device 21b and the pipe system, to be specific the connecting pipe 22a, and for emitting heat a further heat conductor 24b is provided between the pipe system, to be specific the connecting pipe 22b, and a heat transfer surface 25c. In the case of energy extraction, water flows over the heat transfer surface 25c, which water can be supplied via a water supply 25a and a valve 25b. Also provided are temperature sensors, to be specific a temperature sensor 26a for the energy store and a temperature sensor 26b for the extracted steam.

The energy storage and extraction system described with respect to FIG. 2 operates in the following way:

The regulating device 17 regulates the energy or heat content of the energy store, to be specific heating up of the water 23 in the pipe system 22a, 22b, 22c, by switching the switch 21c, and the energy or heat emission, to be specific steam generation, via the valve 25b. This regulation takes place with consideration being given to the cooking process, the maintaining of which always has priority, and to the temperature in the pipe system 22a, 22b, 22c and also the temperature of the steam generated, measured by means of the temperature sensors 26a and 26b.

The pipe system 22a, 22b, 22c can be accommodated in an extremely space-saving manner in an insulating skin (not shown) of a cooking device, the energy extraction being made possible through a welded parallel pipe.

The features of the invention disclosed in the above description, the claims and the drawings may be significant both individually and in any desired combination for realizing the invention is its various embodiments.

What is claimed is:

1. A cooking device comprising a cooking chamber, a heating device, a circulating system, an energy storage and extraction system and a measuring and regulating system which is connected to the heating device, the circulating system and energy storage and extraction system, the energy storage and extraction system said device having at least a first energy store and a second energy store, said first energy store having a first material which has at least one property selected from a group consisting of accumulating heat, consuming latent heat during a phase transition and releasing latent heat during a phase transition, and said second store accommodating a second material which is suitable for accumulating cold energy, means for charging the second energy store with energy selected from heat energy and cold energy, said means for charging with at least one of inductively charging, resistively charging and convectively charging.

2. A cooking device according to claim 1, which includes means for charging the first energy store, said means being selected from a heating device, waste heat selected from heat from waste air, condensate, non-condensed part of a cooking medium and excess steam.

3. A cooking device according to claim 1, wherein the first material is a material selected from a group consisting of metal, a salt, a polymer, water, steam and superheated steam.

4. A cooking device according to claim 1, wherein the second material is a material selected from a group consisting of metal, a salt, a polymer, water and iron.

5. A cooking device according to claim 1, wherein at least one of the first energy store and second energy store is arranged in a space-saving manner in an insulating skin of the cooking device.

6. A cooking device according to claim 1, wherein the energy stored in the energy storage and extraction system is controlled by the measuring and regulating system to provide energy in a form selected from thermal energy, electrical energy and mechanical energy to the cooking device during operation of at least one of the heating device, circulating system, moisture regulating device and steam generator.

7. A cooking device according to claim 1, wherein the energy storage and extraction system includes at least one heat transfer surface and means for convectively extracting energy from the transfer surface.

8. A cooking device according to claim 1, wherein the energy storage and extraction means has means for extracting energy including hot walls and means of vaporizing water on said hot walls to add heat during a cooking process.

9. A cooking device according to claim 1, wherein the first material is steam and the energy storage and extraction system has means for extracting energy comprising restriction and compression of the steam.

10. A cooking device according to claim 1, wherein the energy storage and extraction system includes means for extracting cold energy from the second material by expansion and relaxation to perform at least one function selected from cooling of the cooking chamber, freezing cooking ingredients before cooking, freezing cooking ingredients after cooking and condensing out vapors from the cooking chamber.

11. A cooking device according to claim 1, wherein the measuring and regulating system insures that the maintaining of the cooking process has a highest priority.

* * * * *